(12) United States Patent
Zuge et al.

(10) Patent No.: US 9,358,852 B2
(45) Date of Patent: Jun. 7, 2016

(54) WHEEL SUSPENSION FOR MOTOR VEHICLES

(71) Applicant: AUDI AG, Ingolstadt (DE)

(72) Inventors: Frank Zuge, Schelldorf (DE); Achim Glas, Gaimersheim (DE); Hans-Jurgen Langhoff, Lenting (DE); Christian Bschierl, Denkendorf (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/613,206

(22) Filed: Feb. 3, 2015

(65) Prior Publication Data
US 2015/0151597 A1 Jun. 4, 2015

Related U.S. Application Data

(63) Continuation of application No. 12/010,930, filed on Jan. 31, 2008, now abandoned.

(30) Foreign Application Priority Data

Feb. 7, 2007 (DE) .......................... 10 2007 005 967

(51) Int. Cl.
*B60G 3/14* (2006.01)
*B60G 3/20* (2006.01)
*B60G 7/00* (2006.01)

(52) U.S. Cl.
CPC .. *B60G 3/20* (2013.01); *B60G 3/14* (2013.01); *B60G 7/001* (2013.01); *B60G 2200/14* (2013.01); *B60G 2200/142* (2013.01);
(Continued)

(58) Field of Classification Search
CPC .. B60G 3/06; B60G 2200/14; B60G 2200/18; B60G 2200/142; B60G 2204/129; B60G 2202/312

USPC ...................... 280/124.146, 124.145, 124.15, 280/124.153, 124.136, 124.138
See application file for complete search history.

(56) References Cited

U.S. PATENT DOCUMENTS 4,145,072 A * 3/1979 Matschinsky .......... 280/124.138
4,448,441 A * 5/1984 Brummer et al. ...... 280/124.146
(Continued)

FOREIGN PATENT DOCUMENTS

DE 3843613 A1 * 7/1990

OTHER PUBLICATIONS

Abstract and Machine Translation of Hajto (DE 3843613).

*Primary Examiner* — Ruth Ilan
(74) *Attorney, Agent, or Firm* — Vorys, Sater, Seymour and Pease LLP

(57) ABSTRACT

The invention relates to a wheel suspension for motor vehicles, with at least one upper transverse arm and two lower separated transverse arms per wheel, which are each arranged at a defined angle to one another and are articulated to the body of the vehicle and also to a wheel carrier, furthermore with a track rod which acts on the steering lever of the wheel carrier and with a McPherson strut unit which, aligned at a defined angle to the vertical, is coupled to the body of the vehicle and to the forward lower transverse arm via a rubber-metal sleeve bearing. To achieve improved driving comfort of the motor vehicle it is suggested that at least the forward lower transverse arm (12) is arranged such that the coupling point (12c) of the McPherson strut unit (20) on the transverse arm (12) when the wheel is deflected viewed in the transverse direction of the vehicle (30) runs parallel to the longitudinal axis (28) of the McPherson strut unit (20).

19 Claims, 3 Drawing Sheets

(52) U.S. Cl.
CPC ....... *B60G2200/18* (2013.01); *B60G 2200/466* (2013.01); *B60G 2202/12* (2013.01); *B60G 2202/31* (2013.01); *B60G 2202/312* (2013.01); *B60G 2204/129* (2013.01)

(56) References Cited

U.S. PATENT DOCUMENTS

| | | | | |
|---|---|---|---|---|
| 5,499,839 | A * | 3/1996 | Wahl et al. | 280/124.145 |
| 5,782,484 | A * | 7/1998 | Kuhn, Jr. | 280/124.142 |
| 5,975,541 | A * | 11/1999 | Harara et al. | 280/5.524 |
| 6,102,419 | A * | 8/2000 | Chun | 280/124.135 |
| 6,116,626 | A * | 9/2000 | Cherry et al. | 280/124.135 |
| 6,305,700 | B1 * | 10/2001 | Bruehl | 280/124.135 |
| 6,767,022 | B1 * | 7/2004 | Chevalier | 280/124.136 |
| 7,506,882 | B2 * | 3/2009 | Gerrard | 280/124.134 |
| 2004/0140640 | A1 * | 7/2004 | Frantzen et al. | 280/124.107 |
| 2005/0146111 | A1 * | 7/2005 | Yamazaki et al. | 280/124.135 |
| 2006/0006623 | A1 * | 1/2006 | Leclair | 280/93.512 |

* cited by examiner

WHEEL SUSPENSION FOR MOTOR VEHICLES

CROSS REFERENCE TO RELATED APPLICATIONS

This application is a continuation of U.S. application Ser. No. 12/010,930, filed on Jan. 31, 2008, herein incorporated by reference in its entirety, which claims priority from German Application No. 10 2007 005 967.3 filed Feb. 7, 2007, hereby incorporated by reference in its entirety.

The invention relates to a wheel suspension for motor vehicles according to the preamble of claim 1.

A wheel suspension such as this is shown, for example, in DE 38 43 613 A1 in which the lower and optionally the upper transverse arm of the wheel guidance are individual transverse arms which, in conjunction with a track rod which is articulated to the body or to the steering of the motor vehicle, form track-stable wheel guidance. The advantage of such a wheel suspension with detached transverse arms lies especially in formation of a virtual steering axle which, for the most part, can be designed independently of structural constraints so that favorable axle values such as camber, axle pin rake, roll radius, and the disturbing-force lever arm for the driven wheels (dimension a), etc. are adjustable. In conjunction with the spring system and damping of the motor vehicle there can be a McPherson strut unit with a telescoping shock absorber which is coupled in a structurally favorable manner to the forward lower transverse arm of the wheel suspension by way of a rubber-metal sleeve bearing.

The object of the invention is to propose a wheel suspension of the generic type which is further improved with respect to driving comfort.

This object is achieved according to the invention with the characterizing features of claim 1. Advantageous developments of the invention are described by the dependent claims.

According to the invention, it is proposed that at least the front lower transverse arm is arranged such that the coupling point of the McPherson strut unit on the transverse arm when the wheel is deflected, viewed in the transverse direction of the vehicle, runs parallel to the longitudinal axis of the McPherson strut unit. As has been recognized, with this measure squeezing of the lower rubber-metal sleeve bearing can be prevented which otherwise occurs relative to the transverse arm as a result of a tilt of the McPherson strut unit which changes over the spring path of the wheel during deflection and rebound. This results in an improved response behavior in the spring system of the motor vehicle; stick-slip effects which may occur on the telescoping shock absorber are eliminated.

A design of the wheel suspension which is also advantageous with respect to the other driving properties of the motor vehicle consists in that the lower forward transverse arm is positioned essentially in the transverse direction of the motor vehicle and the rear lower transverse arm is positioned approx. 45° to the rear tilted inside thereto.

Furthermore, the body-side bearing points of the lower transverse arms can be aligned essentially horizontally at the same height, with which unwanted migration of the indicated lower bearing point of the McPherson strut unit over the entire spring path of the wheel suspension is likewise advantageously avoided.

In the conventional manner the tilt of the McPherson strut unit can be approx. 5 to 10 degrees up to the rear and up to the inside in order to effect easily manageable matching of the wheel-guiding transverse arms to the McPherson strut unit, in addition to a structurally favorable arrangement of the McPherson strut unit.

In this connection, the horizontal plane defined by the two lower transverse arms can also be aligned perpendicular to the tilt of the McPherson strut unit viewed in the transverse direction of the vehicle by a suitable design of the wheel carrier-side coupling points.

Finally, the body-side bearing of the forward lower transverse arm in the transverse direction of the motor vehicle can be made stiffer than in the direction of the longitudinal axis of the McPherson strut unit. This results in an additional improvement of driving comfort and the damping properties of the wheel suspension relative to the body of the vehicle without adversely affecting the guiding properties of the forward transverse arm.

One embodiment of the invention will be detailed below. The figures are schematic.

Figure 1:
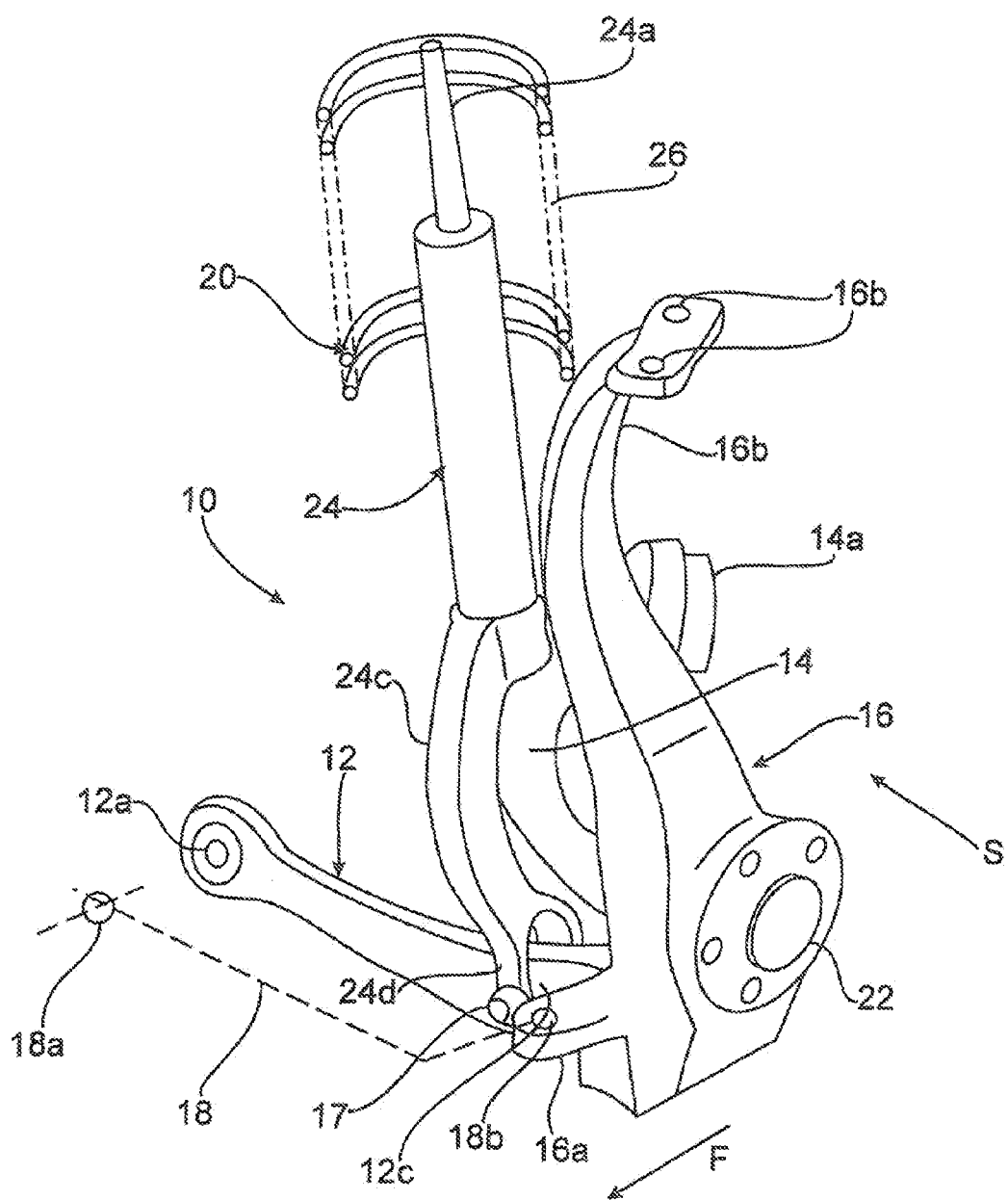
FIG. 1 shows, with one wheel carrier, two lower, detached transverse arms, a suggested track rod and a McPherson strut unit.
Figure 2:
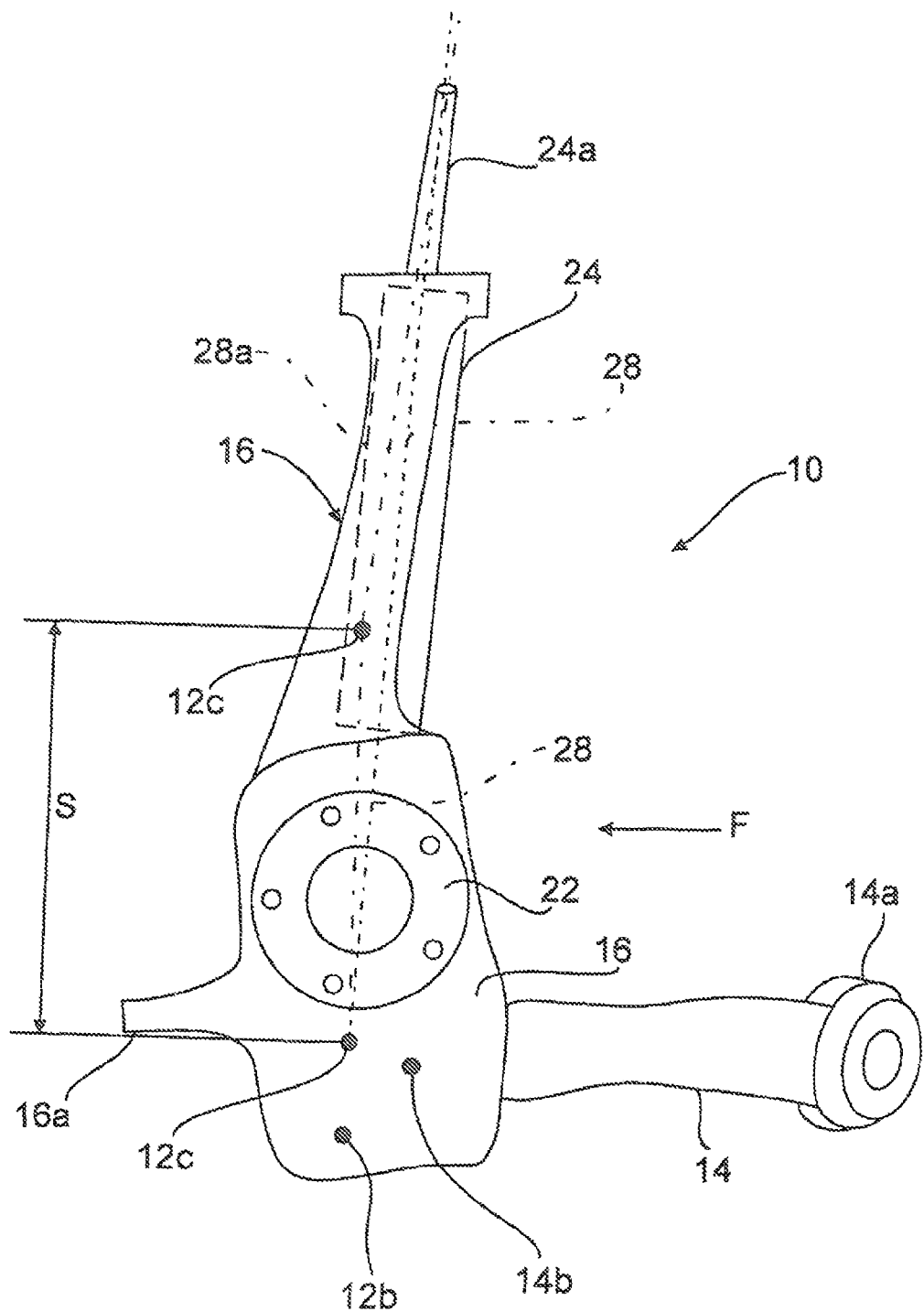
FIG. 2 shows a side view S of FIG. 1 of the wheel suspension.
Figure 3:
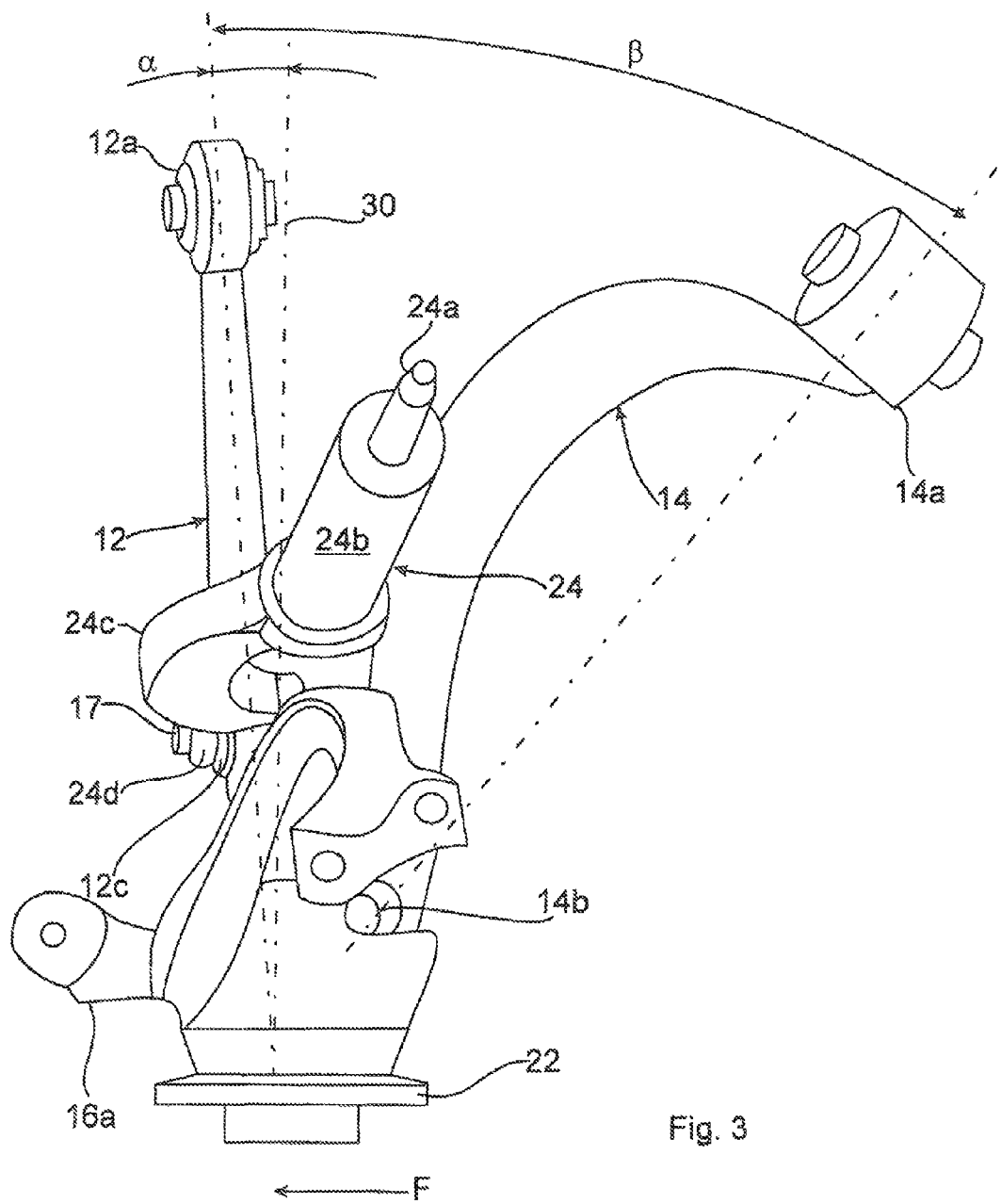
FIG. 3 shows a top view of the wheel arrangement as shown in FIGS. 1 and 2.

FIGS. 1 to 3 show the lower plane of the front left wheel suspension 10 for motor vehicles, which wheel suspension is composed essentially of two lower, individual transverse arms 12, 14, one wheel carrier 16, a track rod 18 which is only suggested, and a McPherson strut unit 20. The direction of travel of the motor vehicle is indicated by F. The wheel which is not shown is attached to the wheel flange 22 which is pivoted-mounted in the wheel carrier 16.

The transverse arms 12, 14 are separate transverse arms which are coupled to the body of the motor vehicle which is not shown (or an auxiliary frame) via angularly movable rubber-metal sleeve joints 12a, 14a and to the wheel carrier 16 via ball joints 12b, 14b (compare FIG. 2).

The third wheel guiding element, located in the lower plane of the wheel suspension 10, is the track rod 18 which is connected via a ball joint 18a to a steering means of the motor vehicle which is not shown and also is coupled to one steering arm 16a of the wheel carrier 16 via a ball joint 18b.

In the wheel suspension 10 for non-steered wheels of a motor vehicle, the track rod 18 is coupled to the body as a further transverse arm.

The McPherson strut unit 20 is conventionally composed of a telescoping shock absorber 24 and a helical compression spring or support spring 26 which coaxially surrounds the shock absorber.

The piston rod 24a of the shock absorber 24 is coupled via an absorber bearing which is not shown to a bearing bracket or directly to the body of the motor vehicle on which the upper end of the support spring 26 is also supported. The lower end of the support spring 26 is supported via a spring plate on the absorber cylinder 24b of the shock absorber 24.

The absorber cylinder 24b of the shock absorber 24 is furthermore coupled to the forward transverse arm 12 referred to as the support rod 12 below via a support part 24c which is made slightly arc-shaped with a fork-shaped connecting part 24d with interposition of a rubber-metal sleeve joint 12c in the vicinity of the wheel carrier 16. The axis of the sleeve joint 12c is aligned like the pertinent attachment screw 17 in the longitudinal direction of the motor vehicle.

On the neck 16b of the wheel carrier 16 which is lengthened to the top, there are receiving holes for connecting the individual upper transverse arms (or a suspension arm) of the wheel suspension 10, for the sake of clarity, the individual transverse arms are not shown and neither are the disk brake means and the wheel of the wheel suspension 10.

The forward lower transverse arm or support rod 12 at this point is arranged such that the coupling point 12c (center point of the sleeve joint 12c) of the McPherson strut unit 20 on the support rod 12 when the wheel is deflected (spring path s) viewed in the transverse direction of the vehicle (compare FIG. 2) runs at least approximately parallel to the longitudinal axis (dot-dash line 28) of the McPherson strut unit 20. The longitudinal axis 28 of the McPherson strut unit 20 therefore changes only little over the deflection path of the wheel suspension 10 on 28a and does not cause squeezing of the sleeve joint 12c or unilaterally acting moments of the support spring 26 on the shock absorber 24.

For this purpose, the support rod 12, as is to be seen from FIG. 3, is positioned with a deviation of approx. 4 degrees (angle α), that is, more or less in the transverse direction of the motor vehicle (dot-dash line 30), and the rear lower transverse arm is positioned approx. 45 degrees (angle β) to the rear tilted inside thereto.

Furthermore the body-side bearing points 12a, 14a, and their rubber-metal sleeve joints 12a, 14a of the lower transverse arms 12, 14 are aligned essentially horizontally at about the same height.

The tilt of the McPherson strut unit 20 relative to the vertical is moreover 5 to 10 degrees up and to the rear and up to the inside, as is to be seen from FIGS. 2 and 3.

The two lower transverse arms are arranged skewed to one another. Their alignment is chosen such that parallel displacement of the lower rear transverse arm with the wheel-side articulation point 14b into the articulation point 12b of the support rod with the latter yields a plane which is almost perpendicular to the illustrated tilt (approx. 5 degrees) of the McPherson strut unit 20 viewed in the transverse direction of the vehicle 20.

Finally, the body-side bearing 12a of the forward lower support rod 12 in the transverse direction 30 of the vehicle is designed to be stiffer than in the direction of the longitudinal axis 28 of the McPherson strut unit 20 (that is, in the vertical axis). These "spread" sleeve bearings are prior art and can have, for example, material-weakening lobes (in the vertical axis) or material-strengthening metal inserts (in the transverse axis), etc., and therefore are not shown.

The invention claimed is:

1. A wheel suspension for a motor vehicle, comprising:
a wheel carrier comprising a wheel flange;
a first lower separate suspension link and a second lower separate suspension link (12, 14) per wheel carrier arranged at a defined angle to each other and articulated to the body of the motor vehicle and also to a wheel carrier (16),
wherein the first lower suspension link comprises a forward lower transverse arm having a first end and a second end, the forward lower transverse arm first end pivotally connected to the wheel carrier at a first pivot point of the wheel carrier and located on or in proximity to a center vertical axis of said wheel flange and the wheel carrier,
the forward lower transverse arm second end pivotally connectable to the body of the vehicle, the forward lower arm having a longitudinal centerline positioned essentially in a transverse direction of the motor vehicle relative to a transverse axis of the vehicle extending through the wheel flange;
wherein the second lower suspension link comprises a rear lower transverse arm having a rear lower arm first end and a rear lower transverse arm second end, the rear lower transverse arm first end pivotally connected to the wheel carrier at a second pivot point of the wheel carrier, the rear lower transverse arm second end pivotally connectable to the body, the rear lower transverse arm having a longitudinal centerline set at a rearward angle relative to the centerline of the forward lower arm;
the wheel carrier having opposed first and second sides, the wheel flange on the first side, the first and second pivot points on the second side; and
a McPherson strut pivotally connected by a rubber metal sleeve joint to the forward lower transverse arm adjacent to the wheel carrier and connectable to the body, the McPherson strut being aligned with the center vertical axis of the wheel flange and the wheel carrier,
wherein the McPherson strut is disposed relative to the forward lower transverse arm and the centerlines of the lower transverse arms are skewed relative to each other to be slightly out of a horizontal plane, and a plane that contains both lower transverse arm centerlines is disposed at or nearly perpendicular to a longitudinal centerline of the strut viewed in the transverse direction of the vehicle,
wherein the front suspension link is arranged such that while the suspension is mounted on the vehicle and the wheel carrier deflects and/or is steered, a center point of the pivotal connection of the McPherson strut on the forward lower transverse arm viewed in a transverse direction of the vehicle is displaced along a line of travel disposed adjacent to the longitudinal centerline of the McPherson strut approximately parallel to the longitudinal centerline axis of the McPherson strut.

2. The wheel suspension according to claim 1, wherein the forward lower transverse arm has the longitudinal centerline set at a forward angle of 0-4° relative to the transverse axis of the vehicle extending through the center of the wheel flange;
wherein the McPherson strut is tilted from the vertical in a transverse direction toward said vehicle in the range of 5° to 10° and is tilted from the vertical in a rearward direction and in an inwards transverse direction away from the wheel carrier in the range of 5° to 10°, when the suspension is mounted on the vehicle.

3. The wheel suspension according to claim 1, wherein the pivotal connections of the lower transverse arms are disposed horizontally when the suspension is mounted on the vehicle, wherein a body-side bearing of the forward lower transverse arm in the transverse direction of the motor vehicle is stiffer than in the direction of the longitudinal axis of the McPherson strut.

4. The wheel suspension according to claim 1, wherein the wheel carrier has first and second opposed sides, wherein the wheel flange is on the first side of the wheel carrier and the first and second pivot points are on the second side of the wheel carrier, wherein the second pivot point is offset rearwardly relative to the first pivot point.

5. The wheel suspension according to claim 4, wherein the second pivot point is located above the first pivot point.

6. The wheel suspension according to claim 1, wherein the body-side bearing points and their rubber-metal sleeve joints of the lower transverse arms are aligned essentially horizontally at about the same height.

7. The wheel suspension according to claim 1, wherein the first pivot point and second pivot point are provided by ball joints.

8. The wheel suspension according to claim 1, wherein an absorber cylinder of the shock absorber is coupled to the forward lower transverse arm via a support part which is arc shaped with a fork connecting part with interposition of the rubber metal sleeve joint of the forward lower transverse arm between prongs of the fork connecting part in the vicinity of the wheel carrier, an attachment screw attaching the rubber metal sleeve joint of the forward lower transverse arm between the prongs of the fork, wherein an axis of the sleeve joint is aligned as is the attachment screw in the longitudinal direction of the motor vehicle.

9. The wheel suspension according to claim 1, wherein the front suspension link is arranged such that while the suspension is mounted on the vehicle and the wheel carrier deflects and/or is steered, a center point of the pivotal connection of the McPherson strut on the forward lower transverse arm viewed in a transverse direction of the vehicle is displaced along a line of travel disposed adjacent to the longitudinal centerline of the McPherson strut approximately parallel at an angle between 0 and 5 degrees to the longitudinal centerline axis of the McPherson strut.

10. A wheel suspension for motor vehicles, comprising
a wheel carrier comprising a wheel flange;
a first lower separate suspension link and a second lower separate suspension link per wheel carrier,
wherein the first lower suspension link comprises a forward lower transverse arm pivotally connected to the wheel carrier at a first pivot point located on the wheel carrier and located along an inclined center vertical axis of the wheel carrier, the forward lower transverse arm pivotally connectable to the body of the vehicle,
the forward lower transverse arm having a longitudinal centerline set at a forward angle relative to a transverse axis of the vehicle extending through a center of the wheel flange, wherein the forward lower transverse arm is positioned essentially in a transverse direction of the motor vehicle,
wherein the second lower suspension link comprises a rear lower transverse arm pivotally connected to the wheel carrier at a second pivot point located on the wheel carrier and pivotally connectable to the body, the rear lower transverse arm having a longitudinal centerline set at a rearward angle relative to the centerline of the forward lower transverse arm,
the forward lower arm and the rear lower transverse arm are arranged at a defined angle to each other and are articulated to the body of the motor vehicle and also to the wheel carrier,
a McPherson strut which, oriented at a defined angle to a vertical direction, is articulated via a pivot point to the body of the motor vehicle and to the front lower suspension link, such that the strut is pivotally connected to the forward lower arm adjacent to the wheel carrier and connectable to the body,
wherein at least the front lower suspension link is arranged in such a way that, while the suspension is mounted on the vehicle when the wheel is deflected and/or steered, the pivot point of the McPherson strut on the suspension link, viewed in a transverse direction of the vehicle, extends by being displaced along a line of travel approximately parallel, to a longitudinal axis of the McPherson strut.

11. The wheel suspension according to claim 10,
wherein the forward lower transverse arm has the longitudinal centerline set at a forward angle of 0-4° relative to the transverse axis of the vehicle extending through the center of the wheel flange;
wherein the McPherson strut is tilted from vertical in a transverse direction toward a longitudinal center plane of said vehicle in the range of 5° to 10° and is tilted from vertical in a rearward direction in the range of 5° to 10°, when the suspension is mounted on the vehicle.

12. The wheel suspension for a motor vehicle of claim 10, wherein:
the wheel carrier having opposed first and second sides, the wheel flange on the first side, the first and second pivot points on the second side; and
the strut being aligned with the inclined center vertical axis of the wheel carrier, the strut and the lower transverse arms being configured so that when the suspension is mounted on the vehicle and the wheel carrier is deflected upwardly, a center point of the pivotal connection between the strut and the forward lower arm is displaced along a vertical line of travel located adjacent to the longitudinal centerline of the strut.

13. The wheel suspension according to claim 12, wherein the pivotal connections of the lower transverse arms are disposed horizontally when the suspension is mounted on the vehicle, wherein a body-side bearing of the forward lower transverse arm in the transverse direction of the motor vehicle is stiffer than in the direction of the longitudinal axis of the McPherson strut.

14. The wheel suspension according to claim 10, wherein the wheel carrier has first and second opposed sides, wherein the wheel flange is on the first side of the wheel carrier and the first and second pivot points are on the second side of the wheel carrier, wherein the second pivot point is offset rearwardly relative to said first pivot point.

15. The wheel suspension according to claim 14, wherein the second pivot point is located above said first pivot point.

16. The wheel suspension according to claim 10, wherein body-side bearing points of the forward lower arm and the rearward lower arm are aligned essentially horizontally at the same height.

17. The wheel suspension according to claim 10, wherein an absorber cylinder of the shock absorber is coupled to the forward lower transverse arm via a support part which is arc shaped with a fork connecting part with interposition of the rubber metal sleeve joint of the forward lower transverse arm between prongs of the fork connecting part in the vicinity of the wheel carrier, an attachment screw attaching the rubber metal sleeve joint of the forward lower transverse arm between the prongs of the fork, wherein an axis of the sleeve joint is aligned as is the attachment screw in the longitudinal direction of the motor vehicle.

18. The wheel suspension according to claim 10, wherein a center of the wheel flange is located on or in proximity to said inclined center vertical axis of the wheel carrier.

19. The wheel suspension according to claim 10, wherein the front suspension link is arranged such that while the suspension is mounted on the vehicle and the wheel carrier deflects and/or is steered, a center point of the pivotal connection of the McPherson strut on the forward lower transverse arm viewed in a transverse direction of the vehicle is displaced along a line of travel disposed adjacent to the longitudinal centerline of the McPherson strut approximately parallel at an angle between 0 and 5 degrees to the longitudinal centerline axis of the McPherson strut.

* * * * *